(12) United States Patent
Arias et al.

(10) Patent No.: US 6,879,653 B2
(45) Date of Patent: Apr. 12, 2005

(54) METHOD AND DEVICE FOR MEASURING THE DIAMETER OF A PERIPHERAL ROD IN A FUEL ASSEMBLY OF A NUCLEAR REACTOR

(75) Inventors: Jairo Arias, Genas (FR); Sandrine Maire, Caluire (FR)

(73) Assignee: Framatome, ANP, Courbevoie (FR)

( * ) Notice: Subject to any disclaimer, the term of this patent is extended or adjusted under 35 U.S.C. 154(b) by 94 days.

(21) Appl. No.: 10/258,695

(22) PCT Filed: Mar. 27, 2001

(86) PCT No.: PCT/FR01/00934

§ 371 (c)(1),
(2), (4) Date: Oct. 25, 2002

(87) PCT Pub. No.: WO01/82307

PCT Pub. Date: Nov. 1, 2001

(65) Prior Publication Data

US 2003/0138071 A1 Jul. 24, 2003

(30) Foreign Application Priority Data

Apr. 27, 2000 (FR) .......................................... 00 05408

(51) Int. Cl.⁷ .............................................. G21C 17/00
(52) U.S. Cl. ...................... 376/252; 376/251; 376/258; 376/261; 376/245; 376/247; 33/501.6; 33/783; 33/784; 33/793
(58) Field of Search ................................ 376/251, 252, 376/258, 261, 245, 247, 248, 249; 33/501.6, 783, 784, 793, 706, 700, 788, 502; 73/620, 633

(56) References Cited

U.S. PATENT DOCUMENTS

| | | | | |
|---|---|---|---|---|
| 4,036,686 A | * | 7/1977 | Weilbacher et al. | ......... 376/251 |
| 4,175,000 A | * | 11/1979 | Jabsen | ......................... 376/251 |
| 4,253,240 A | * | 3/1981 | Feichtinger | ................... 33/558 |
| 4,279,079 A | * | 7/1981 | Gamberini et al. | ............ 33/783 |
| 4,344,233 A | * | 8/1982 | Albertazzi | ................ 33/501.06 |
| 4,420,455 A | * | 12/1983 | Qurnell et al. | ............... 376/245 |
| 4,473,951 A | * | 10/1984 | Golinelli et al. | ............ 33/501.6 |
| 4,649,650 A | * | 3/1987 | Fink et al. | ..................... 33/783 |
| 4,650,637 A | * | 3/1987 | Chubb | ......................... 376/253 |
| 4,759,897 A | * | 7/1988 | Tolino et al. | ................ 376/245 |
| 4,837,936 A | * | 6/1989 | Lockhart | ...................... 33/783 |
| 4,892,701 A | * | 1/1990 | Mauvieux et al. | ........... 376/258 |
| 5,070,622 A | * | 12/1991 | Butzin et al. | .................. 33/793 |
| 5,112,566 A | * | 5/1992 | Butzin et al. | ................ 376/245 |
| 5,148,612 A | * | 9/1992 | Walser et al. | .................. 33/784 |
| 5,255,295 A | * | 10/1993 | Boulet | ......................... 376/247 |
| H1262 H | | 12/1993 | Bacvinskas et al. | ......... 376/252 |
| 5,282,229 A | * | 1/1994 | Ukai et al. | ................... 376/245 |
| 5,754,611 A | * | 5/1998 | Petit | ............................ 376/258 |
| 6,125,160 A | * | 9/2000 | Gaylord et al. | .............. 376/261 |
| 6,549,600 B1 | * | 4/2003 | Beier et al. | .................. 376/258 |

FOREIGN PATENT DOCUMENTS

| | | |
|---|---|---|
| DE | 35 21 268 | 12/1986 |
| EP | 0 392 832 | 10/1990 |
| FR | 2 721 704 | 12/1995 |

* cited by examiner

Primary Examiner—Michael J. Carone
Assistant Examiner—John Richardson
(74) Attorney, Agent, or Firm—Kenyon & Kenyon

(57) ABSTRACT

The diameter of a segment of a peripheral rod in a fuel assembly is measured between two successive spacer grids. A measuring tool is positioned at a level situated between the two successive spacer grids, the tool comprising two measuring fingers that are free to move relative to each other in a first horizontal direction and that are urged towards each other by a resilient return arrangement, and that extend in a second horizontal direction perpendicular to the first horizontal direction. The measuring fingers are moved in the second horizontal direction towards a rod so as to put two contact pieces of the measuring fingers into contact with two zones of the rod segment. The measuring fingers are moved in the vertical axial direction of the rod along its segment situated between the two spacer grids and an electromagnetic sensor is used to measure the distance between the measuring fingers in the first horizontal direction while the measuring fingers are being moved axially.

12 Claims, 4 Drawing Sheets

METHOD AND DEVICE FOR MEASURING THE DIAMETER OF A PERIPHERAL ROD IN A FUEL ASSEMBLY OF A NUCLEAR REACTOR

FIELD OF THE INVENTION

The invention relates to a method and to a device for measuring the diameter of a peripheral rod of a fuel assembly of a nuclear reactor that is cooled with light water, and in particular a fuel assembly for a nuclear reactor that is cooled with pressurized water.

BACKGROUND INFORMATION

The fuel assemblies for reactors cooled with light water and in particular the fuel assemblies for reactors cooled with pressurized water generally comprise a bundle of fuel rods each made up of a stack of pellets of fuel material inside tubular cladding, and a framework for supporting the fuel rods, the framework comprising spacer grids that are spaced apart along the rods of the bundle, guide tubes that occupy certain rod positions inside the bundle, and two end nozzles.

Inside the bundle, the fuel rods are supported in parallel dispositions by the spacer grids which are constituted by respective square-mesh arrays of square cells, each of which has a fuel rod engaged therein, or possibly a guide tube in certain positions inside the array.

The spacer grids and the end nozzles which are fixed to the ends of the guide tubes at opposite ends of the bundle of rods are square in shape so that the overall shape of the fuel assembly bundle is that of a right prism of square section, i.e. that of a rectangular parallelepiped.

The fuel rods of the bundle that are located in the outside faces of the fuel assembly that are perpendicular in pairs constitute the peripheral rods of the fuel assembly, and they Inside the cells of the spacer grids, the fuel rods are held by springs bearing against rigid abutments, thus making it possible both to support the rods in transverse planes in a regular array and also in the axial longitudinal direction of the bundle.

In a nuclear reactor in operation, the fuel assemblies are subjected to irradiation which leads to certain modifications in the structure and size of the elements constituting the fuel assembly.

In particular, the pellets of fuel material in the rods can swell to a certain extent while the nuclear reactor is in operation. This results in the tubular cladding of the rods deforming and in an increase in the diameter of the rods.

In order to know how the fuel behaves in the nuclear reactor and in order to plan maintenance operations on the fuel assemblies, it can be important, after the fuel assembly has been in use for a certain length of time in the core of the nuclear reactor, to measure the diameter of the rods, at least in certain zones of the rods.

It is advantageous to be able to perform such measurements without taking the fuel assembly apart, but under such circumstances, diameter measurements are restricted to the peripheral rods in the fuel assembly that are accessible in the side faces of the assembly.

In addition, while the nuclear reactor is in operation, the reactor cooling water circulates a high speed in contact with the rods held in the framework by springs and dimples in the cells of the spacer grids.

As a result, the rods are caused to vibrate and are therefore subject to a certain amount of wear where they come into contact with the dimples inside the spacer grids.

It is necessary to be able to measure the wear in those segments of the rods that lie inside the spacer grids after the fuel assembly has been in use for a certain length of time in the nuclear reactor.

It is desirable to be able to perform these measurements without having to take the fuel assembly apart.

Fuel assemblies taken out from the nuclear reactor, after the reactor has stopped and cooled, are generally deposited in a deactivation pool situated in a fuel building, close to the building that houses the nuclear reactor.

Fuel assemblies are moved within the fuel pool by using a handling and hoist tool carried by a fuel pit bridge that moves over the fuel pool. In addition, an elevator which is fixed to a wall of the pool serves to move the fuel assemblies in the vertical direction.

The unloading of fuel assemblies that is performed after the nuclear reactor has cooled makes use of a loading machine which travels over a reactor pool into which the nuclear reactor vessel containing the fuel assemblies opens out, the vessel and the pool being filled with water while the fuel assemblies are being handled.

The fuel assemblies can be measured either in the fuel pool or in the nuclear reactor pool, depending on how the operations of loading and unloading the fuel assemblies are performed.

Nevertheless, a method has not been known in the past enabling the diameter of peripheral rods to be measured with very high measurement accuracy in a fuel assembly along those segments of the rod that extend between two successive spacer grids or along those segments of the rods that are received inside the spacer grids and that are subjected to wear in the reactor in operation, without it being necessary to take the fuel assembly apart.

SUMMARY

The object of the invention is thus to propose a method of measuring the diameter of a peripheral rod of a fuel assembly of a nuclear reactor cooled by light water, the fuel assembly comprising a bundle of fuel rods and a framework for supporting the fuel rods, the framework comprising spacer grids distributed in an axial longitudinal direction of the bundle of rods, guide tubes disposed in certain positions of the rods inside the bundle, and end nozzles, the measurement being performed underwater in a pool in which the fuel assembly is placed so that its longitudinal axis extends vertically, and being performed between two successive spacer grids along a longitudinal segment of a rod situated at the periphery of the fuel assembly, which method makes it possible to perform highly accurate measurements remotely and without taking the fuel assembly apart.

For this purpose, the method comprises the steps of:
placing a measuring tool at a level situated between two successive spacer grids, the tool having two measuring fingers with freedom to move relative to each other in a first horizontal direction, the fingers being urged towards each other by a resilient return arrangement and extending in a second horizontal direction perpendicular to the first horizontal direction;
moving the measuring fingers in the second horizontal direction towards the rod so as to put two contact pieces into contact with two zones of the segment of rod occupying diametrically opposite generator lines, the contact pieces being secured to respective ones of the measuring fingers;
moving the two measuring fingers whose contact pieces are pressed against the rod in two zones situated on diametrically opposite generator lines, so that they travel in the vertical axial direction of the rod along the segment situated between the two spacer grids; and using an electromagnetic sensor to measure the distance between the contact pieces of the measuring fingers in the first horizontal direction perpendicular to the axial displacement of the measuring fingers.

BRIEF DESCRIPTION OF THE DRAWINGS

In order to make the invention well understood, there follows a description given by way of example and with reference to the accompanying figures, and relating to a measuring device in accordance with the invention and to the use of the measuring method in accordance with the invention both for measuring the diameter of a longitudinal segment of a peripheral fuel rod of a fuel assembly for a pressurized water nuclear reactor, said segment extending between two spacer grids, and for measuring the wear of a rod in a support zone inside a spacer grid.

DETAILED DESCRIPTION

Figure 1:
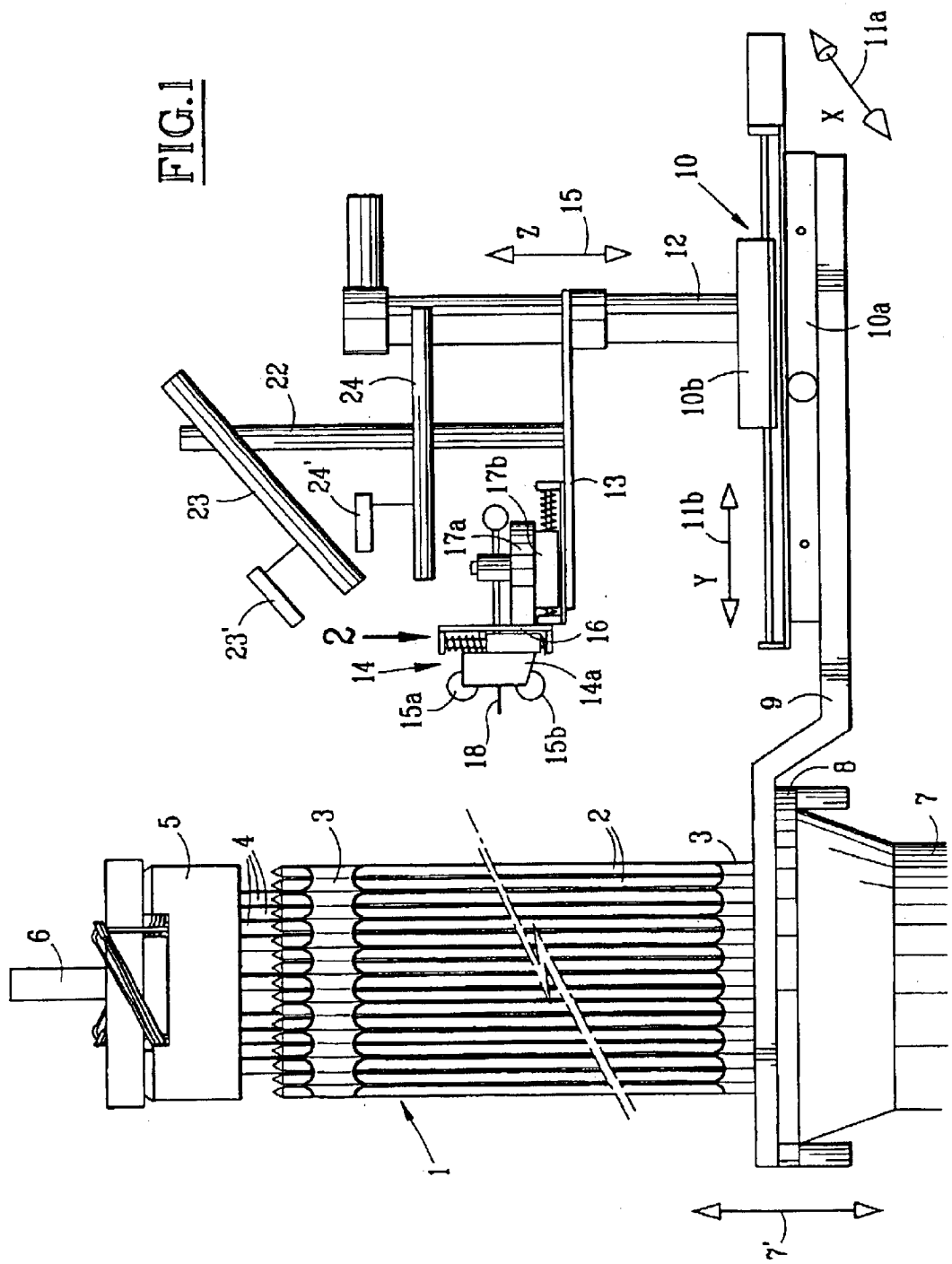
FIG. 1 is a diagrammatic elevation view of a fuel assembly and of a tool for measuring the diameter of the peripheral rods in the fuel assembly.

FIG. 1 illustrates a portion of a fuel assembly 1 for a pressurized water cooled reactor, the assembly being partially engaged in a fuel elevator 7 of the deactivation pool of a nuclear power station.

The fuel assembly 1 comprises a bundle of rods 2 and a framework comprising spacer grids 3 for supporting the rods 2, guide tubes 4, and nozzles fixed to the end portions of the guide tubes 4 at opposite ends of the bundle of rods 2.

In FIG. 1, the top end nozzle 5 of the fuel assembly is illustrated with the fuel assembly being suspended via said nozzle from a sling 6 of a handling device supported by a pit bridge above the top level of the pool.

The fuel assembly which is fully immersed in the water of the pool is disposed with its longitudinal axis parallel to the direction of the fuel rods 2 in the bundle, in a vertical direction, and is inserted in part into the elevator 7 via the top end of the elevator which may be moved vertically, as represented diagrammatically by double-headed arrow 7'.

On the top portion of the elevator 2 having an opening for passing the fuel assembly, there is fixed an adapter ring 8 having a support 9 mounted thereon, which support is preferred to as S-support, and in turn it carries an X-Y displacement table 10.

The X-Y displacement table 10 comprises a bottom table 10a mounted to move on the support 9 in a first horizontal direction X perpendicular to the plane of FIG. 1.

A second table or top table 10b is mounted to move on the table 10a in a second horizontal direction Y perpendicular to the first horizontal direction X.

The X-Y displacement tables 10a and 10b are motor driven and may be moved backwards and forwards along the directions X and Y as represented diagrammatically by double-headed arrows 11a and 11b.

The top X-Y displacement table 10b carries a column 12 having a horizontal support 13 for the measuring tool 14 mounted to move therealong in the vertical direction Z.

Motor-driven displacement arrangements are associated with the vertical column 12 and with the support 13 to move the support 13 vertically at low speed and very accurately, as represented diagrammatically by double-headed arrow 15.

The measuring tool 14 comprises a support 14a carrying two retractable guide pulley wheels 15a and 15b mounted to rotate about horizontal axes and serving to guide the tool 14.

Figure 2:
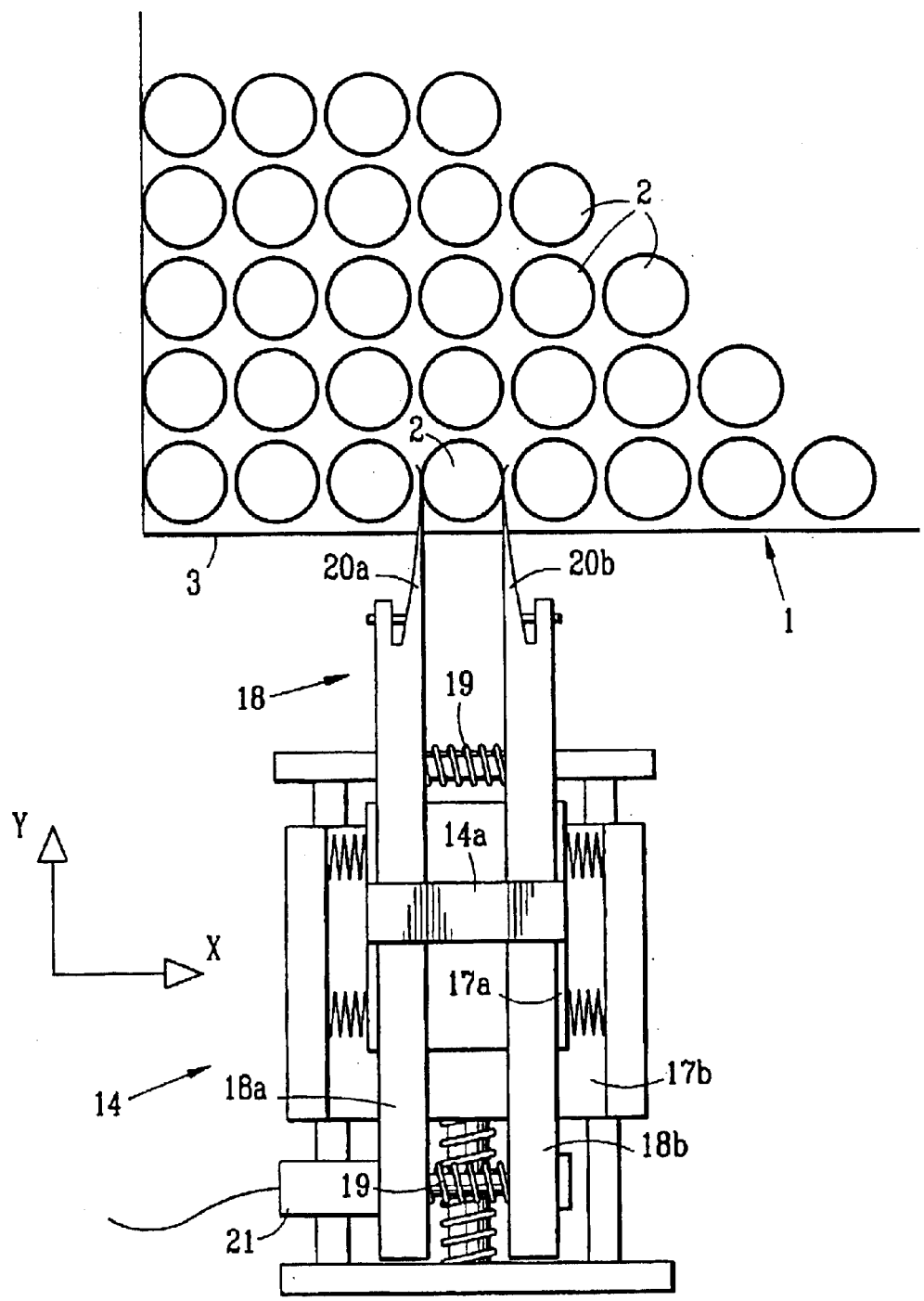
FIG. 2 is a plan view looking along arrow 2 of FIG. 1 illustrating a portion of the measuring tool.

The tool support 14a is itself floatingly mounted in the vertical direction Z via guide elements and springs inside a second support 16, itself floatingly mounted on the tool support 13 via two floating tables 17a and 17b under spring bias and presenting freedom to move respectively in the direction X and in the direction Y, as illustrated in FIG. 2.

This serves to avoid exerting forces that could damage elements of the fuel assembly 1 while displacing the measuring tool in any of the directions X, Y, and Z, said tool comprising in particular measuring fingers 18a and 18b (FIG. 2).

The measuring fingers 18a and 18b of the measuring tool 14 are mounted on the support 14a with a certain amount of freedom to move in the direction X, the fingers being urged towards each other in the direction X by springs such as 19.

The fingers 18a and 18b extend in the direction Y, and at their ends directed towards the fuel assembly 1 they have tapering end portions 20a and 20b which may be engaged on either side of a rod 2 in the fuel assembly, in the two gaps between successive pairs of peripheral rods in the cross-section of the fuel assembly 1, as shown in FIG. 2.

The measuring fingers 18a and 18b which are disposed parallel to each other in the direction Y with a certain amount of freedom to move in the direction X are associated at their end portions remote from the tapering portions 20a and 20b for engaging in the structure of the fuel assembly 1 with an electromagnetic displacement sensor 21, such as a linear variable displacement transducer (LVDT). Such an LVDT sensor comprises a sensor body having an electrical coil in the form of a solenoid mounted therein, together with a sensor rod that is secured to a plunger core that is movable inside the solenoid. The coil is fed with electricity and the induction produced by the coil is modified by moving the magnetic core inside the solenoid in the direction of the sensor rod. This makes it possible to measure displacements very accurately by measuring an electrical current. The sensor body 21 is fixed to one of the measuring fingers 18a and the sensor rod secured to the magnetic core is fixed to the other measuring finger 18b, the sensor rod extending in the direction X of relative displacement between the measuring fingers. It is thus possible to measure the displacement of the identical fingers very accurately while they are being engaged on either side of a rod 2 in the fuel assembly, with the diameter of the rod being measured via the tapering and curved engagement end portions 20a and 20b of the fingers.

A first measurement is performed on a reference rod, and subsequently the displacement of the fingers is measured while they are being engaged on the rod 2 of the fuel assembly on which a measurement is to be performed.

The tool support 13 includes a post 22 having mounted thereon a first video camera 23 which is inclined and fitted with a spotlight 23' and a second video camera 24 likewise fitted with a spotlight 24' and facing in a horizontal direction.

The images provided by the cameras are sent to a measuring station situated above the level of the deactivation pool in the nuclear power station.

The first video camera 23 serves to monitor docking of the engagement portions of the measuring fingers on either side of a rod 2 whose diameter is to be measured, and the second camera 24 has a wider field and is provided with aiming arrangement so as to make it possible to find and aim for the axis of the fuel assembly rod 2 on which measurements are to be performed, so as to make it possible to place and direct the measuring head of the measuring tool 14.

Figure 3:
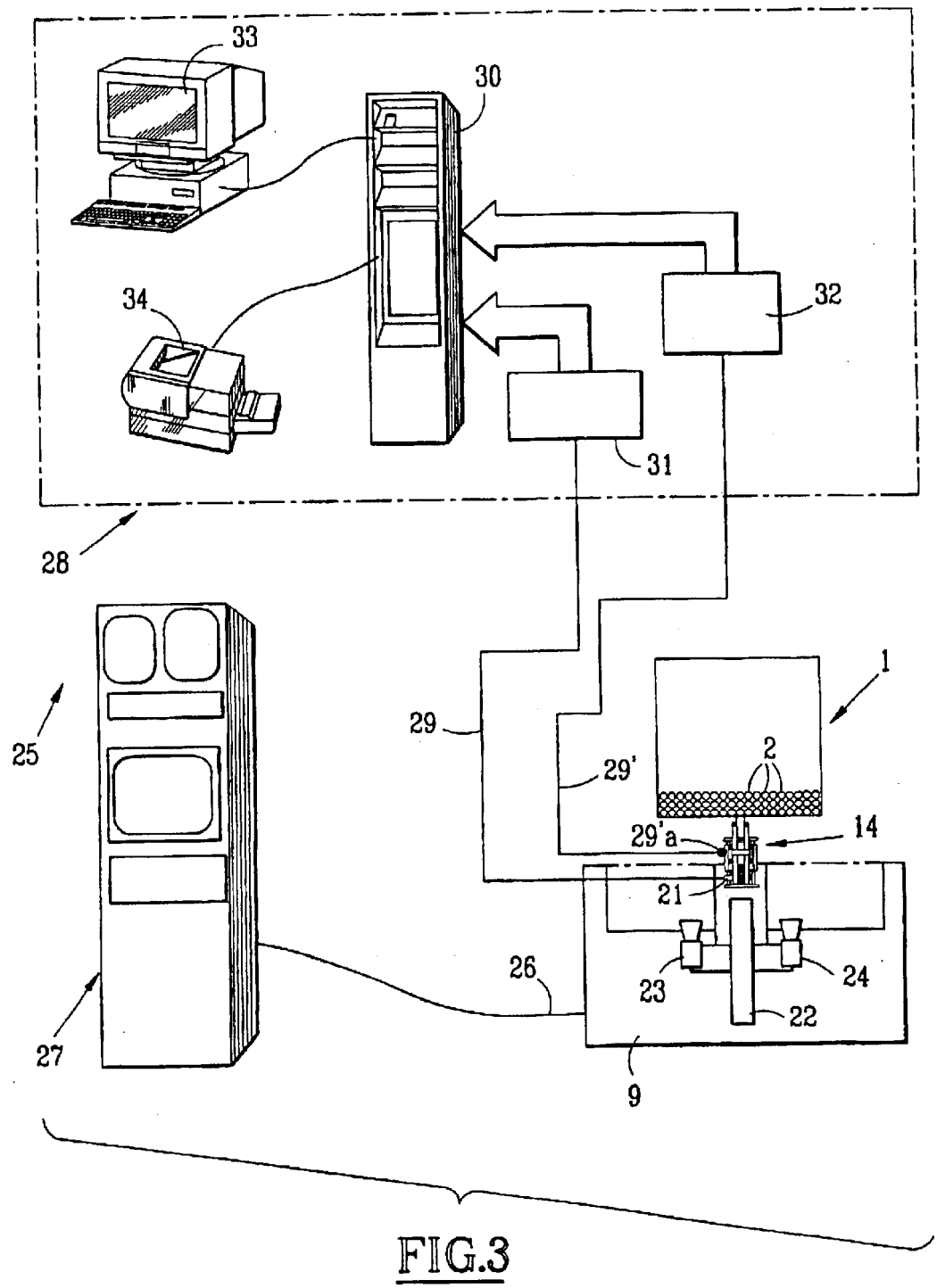
FIG. 3 is an overall view of a measuring installation enabling the method of the invention to be implemented.

FIG. 3 is an overall view of an installation for measuring the diameter of rods in a fuel assembly 1, within the deactivation pool of a nuclear power station.

The measuring installation comprises in particular the measuring station placed above the level of the pool and given overall reference 25.

The measuring device 14 as described above is fixed on the support 9 which is secured to the adapter ring fixed on the top portion of an elevator in which part of the fuel assembly 1 is engaged. The support 9 carries a set of X-Y displacement tables used for moving the measuring tool 14 along two horizontal axes X and Y that are respectively parallel and perpendicular to a front face of the fuel assembly 1 thus enabling the diameter of a rod in a peripheral row to be measured.

From the measuring station 25 located above the level of the pool, the elevator is caused to move in the vertical direction, the measuring tool is caused to move in the vertical direction along the accurate displacement post 12 at low speed, and the displacements of the set of tables 10 in the horizontal directions X and Y are also controlled. For this purpose, the support 9 of the elevator is connected by a cable 26 to an electronics bay 27. The cable 26 serves to transmit signals to the bay 27 from the video cameras 23 and 24 and to display the fuel assembly in the zone where the measuring tool 14 is to intervene, and also display the measuring fingers of the tool 14. The cable 26 also serves to transmit orders to control displacement from the bay 27 to the support 9 of the elevator inside the pool of the nuclear power station.

The bay 27 is a display and control bay having screens for displaying the fuel assembly 1 and the measuring fingers of the tool 14, and also an arrangement for controlling the elevator 7 and the X-Y displacement table 10, and an arrangement for controlling slow displacement of the measuring tool 14 in association with the post 12.

The measuring station 25 also comprises a bay 28 for controlling and acquiring measurements, which bay is connected via a cable 29 to the LVDT sensor 21 and via a cable 29' to a temperature probe 29'a associated with the measuring tool 14.

The bay 28 has a unit 30 for acquiring and processing analog signals, said unit comprising an analog data input card and an analog-to-digital converter module.

The analog inputs coming from the unit 30 are constituted by the signals from the LVDT sensor 21 of the measuring tool 14 which are transmitted to the unit 30 via a conditioning module 31, and by the analog signals coming from the temperature detector 29' a dipped in the water of the deactivation pool in the vicinity of the fuel assembly and connected to the unit 30 via a conditional 32 for conditioning the signals from the temperature probe.

The digitized signals output by the unit 30 are forwarded to a computer 33 which serves to compute and display the measured values of the diameter of the rod 2 in the fuel assembly 1. Measurements are corrected as a function of the temperature as measured by the temperature detector.

The signals are also sent to a printer 34 for printing out the measuring values and values that are computed on the basis of the data.

There follows a description given with reference to FIGS. 1 to 3 in association of an operation for measuring the diameter of a peripheral rod 2 in the fuel assembly 1.

Prior to taking a measurement, the measuring tool 14 is calibrated by placing the contact portions of its fingers so as to bear against two diametrically opposite zones of a reference rod, for example in the measuring station, above the top level of the pool. The corresponding signals from the electromagnetic sensor 21 are measured and recorded.

The fuel assembly 1 on which the diameter of a peripheral rod 2 is to be measured is suspended in a vertical position from a sling of a handling arrangement carried by the fuel pit bridge.

The fuel assembly is inserted into the top end of an elevator 7 having an adapter ring 8 fixing the support 9 thereto carrying the set of X-Y displacement tables 10 and the measuring tool 14 via the post 12 and the arrangement for moving the measuring tool 14 accurately in the vertical direction Z.

The fuel assembly is oriented in such a manner that its side face where the peripheral rod 2 is to be found on which measurements are to be performed is directed towards the measuring head 18 of the measuring tool 14 that has the measuring fingers 18a and 18b. The face of the fuel assembly facing towards the measuring head 18 is parallel to the horizontal direction X and perpendicular to the horizontal direction Y in which the X-Y displacement table 10 moves. The elevator 7 carrying the support 9 is moved vertically up or down as represented by arrow 7' in order to place the measuring tool 14 between two successive spacer grids 3 between which it is desired to measure the diameter of a peripheral fuel rod 2 of the fuel assembly. The distance between two successive spacer grids is about 150 millimeters (mm).

The measuring head 14 is positioned approximately so as to be able to scan the segment of the rod by the measuring fingers 18a and 18b of the measuring head 18 between the two spacer grids 3, and using the slow displacement arrangement associated with the displacement post 12, this arrangement also serving to provide accurate positioning of the measuring head 18 in the vertical direction Z.

The docking camera 23 is used to place the measuring head 14 in a position from which measurements can be started along the segment of the fuel rod 2 between the spacer grids 3.

For this purpose, the set of X-Y displacement tables 10 is used to center the measuring head 18 relative to the axis of the fuel rod 2 by performing movement in the direction X, and then to engage the end portions 20a and 20b of the measuring fingers 18a and 18b of the measuring head 18 on either side of the rod 2 by moving in the Y direction.

The tapering and curved end portions 20a and 20b of the measuring fingers 18a and 18b have contact pieces facing towards each other that may be constituted by inwardly-directed convex surfaces of the curved end portions 20a and 20b of the fingers 18a and 18b.

In the position of the measuring fingers 18a and 18b that enables measurements to be performed, as shown in FIG. 2, the contact surfaces of the fingers bear against two zones of the outside surface of the rod that are situated on two diametrically opposite generator lines. Generally, the surfaces of the contact pieces through which the fingers press against the rod 2 are placed in diametrically opposite locations on a circular cross-section of the rod.

The support 13 and the measuring tool 14 are then caused to move in the vertical direction Z using the displacement arrangement associated with the vertical direction displacement post 12.

The segment of rod extending between the spacer grids 3 is scanned either by moving upwards from the lower grid to the upper grid, or by moving downwards from the upper grid to the lower grid, said movement taking place at a speed that is slow, and during said movement the diameter of the rod is measured continuously. During this displacement in the vertical direction, the measuring head 18 of the tool 14 is guided by the pulley wheels 15a and 15b whose grooves make contact with et rod 2.

The results are displayed on the screen of the microcomputer 33 and/or printed on the printer 34 in the form of diameter values expressed as a function of time or as a function of the position of the measuring points in the vertical direction.

The vertical positions of the points may be identified, e.g. relative to the bottom surface of the top nozzle 5 of the fuel assembly.

After measurements have been performed on one peripheral rod 2, it is possible to perform measurements on an adjacent rod or on any other peripheral rod situated in the face of the fuel assembly that is directed towards the measuring head. After reversing the measuring head in the direction Y, it is moved in the direction X through the appropriate distance to pass from one peripheral rod to the next rod that is to be measured.

In order to perform measurements on another face of the fuel assembly 1 or in order to perform measurements on the diameters of peripheral rods in another fuel assembly, the fuel assembly 1 is raised using the handling arrangement carried by the bridge and the fuel assembly is turned about its axis so as to bring the face in which measurements are to be performed so as to be directed towards the measuring tool, or indeed a new fuel assembly is taken up and introduced in part into the elevator 7.

The method and the apparatus of the invention may be implemented to inspect the wear of a fuel rod 2 in a support zone of the rod situated inside a spacer grid 3.

Initially, after the fuel assembly has been placed in the elevator or before the fuel assembly has been placed in the measuring position, traction is applied in the axial direction on the rod 2 of the fuel assembly so as to move its wear zone inside a cell of the spacer grid 3 and bring said wear zone into a position that is situated above the spacer grid 3.

Figure 4:
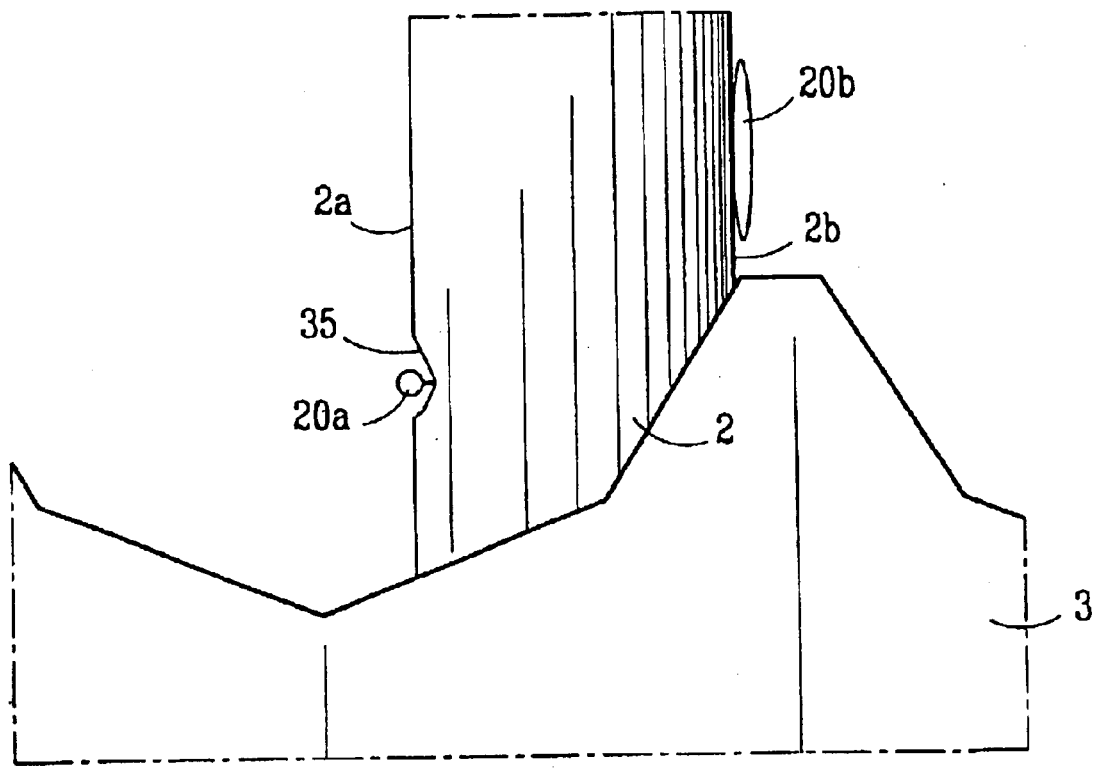
FIG. 4 is a diagrammatic side elevation view of a support segment of a rod in a spacer grid, during an operation of inspecting wear by implementing the method of the invention.
Figure 5:
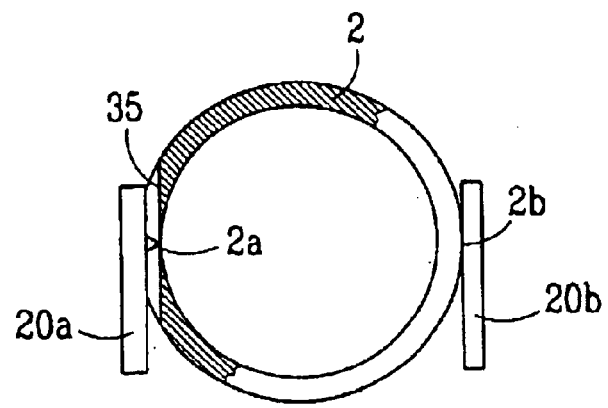
FIG. 5 is a plan view partially in cross-section of a rod and of the measuring device.

FIG. 4 illustrates a fuel rod 2 having a wear zone 35 due to the rod coming into contact with a dimple inside a cell of the spacer grid 3, which wear zone is illustrated in its position after the rod 2 has been moved in the axial direction so that the wear zone 35 lies in a segment of the rod situated above the spacer grid 3.

The measuring method is implemented using measuring fingers in an offset disposition enabling measurements to be performed in a zone situated in the immediate vicinity of the top edge of the spacer grid 3. The guide pulley wheel(s) may be in the retracted position so as to make it possible to get as close as possible to the grid. It is not possible to move the fuel rod 2 of a fuel assembly in the vertical direction through a great amplitude because of the small clearance between the top portions of the rods and the bottom surface of the top nozzle. Furthermore, and as may be seen in FIG. 4, the spacer grid 3 has vanes projecting from its top edge.

As a result, the measuring fingers of the measuring head 18 have end portions 20a and 20b constituted by feelers for making contact with the fuel rod that are of special shape and disposition.

One of the feelers 20a, referred to as a measuring feeler, has a tip enabling contact to be made between the feeler of the measuring finger and the outside surface of the fuel rod 2 in the bottom of the wear zone 35.

The other feeler 20b referred to as a reference feeler, has a relatively large area without interruption so as to enable the measuring head to bear effectively against the rod in a zone that is axial offset relative to the contact zone of the feeler 20a.

After the wear zone 35 of the rod has been extracted from the spacer grid, and after calibration, the measuring head is put into place and moved vertically so as to scan along a generator line 2a of the outside surface of the rod 2 along a segment that includes the wear zone 35, immediately above the top portion of the spacer grid 3.

The feeler 20b of the second measuring finger 18b remains in contact with a generator line 2b of the rod 2 that is diametrically opposite the generator line 2a along which the tip of the feeler 20a of the first measuring finger 18a travels.

This makes it possible to measure very accurately the wear profile of the rod in the zone of the rod that has been retracted from the spacer grid.

The wear profile may be measured in two stages and between the stages the positions of the measuring feeler and of the reference feeler are interchanged to act on opposite generator lines. This provides two wear profiles for the rod.

The method and the device of the invention thus make it possible to perform very accurate dimensional examination on the fuel rods in an irradiated fuel assembly placed in the deactivation pool of a nuclear power station.

The information provided by the measurements may be stored and indexed in the memory of the microcomputer.

The measuring method of the invention may be fully automated.

The invention is not limited specifically to the embodiment described above.

Thus, the measuring tool may be of a shape that is different from that described, and the displacement arrangement or the return arrangement acting on the various elements of the measuring tool may likewise be implemented in other ways.

The invention applies not only to fuel assemblies for a nuclear reactor cooled by pressurized water, but also to other types of fuel assembly having rods disposed in bundles and accessible from the side faces of the fuel assembly.

What is claimed is:

1. A method of measuring a diameter of a peripheral rod of a fuel assembly of a nuclear reactor cooled by light water, the fuel assembly comprising a bundle of fuel rods and a framework for supporting the fuel rods, the framework comprising spacer grids distributed in an axial longitudinal direction of the bundle of rods, guide tubes disposed in certain positions of the rods inside the bundle, and end nozzles, the measuring being performed underwater in a pool in which the fuel assembly is placed so that the fuel assembly longitudinal axis extends vertically, and being performed between two successive spacer grids along a longitudinal segment of a rod situated at a periphery of the fuel assembly, the method comprising the steps of:

placing a measuring tool at a level situated between the two successive spacer grids, the tool having two measuring fingers with freedom to move relative to each other in a first horizontal direction, the fingers being urged towards each other by a resilient return arrangement and extending in a second horizontal direction perpendicular to the first horizontal direction;

moving the measuring fingers in the second horizontal direction towards the rod so as to put two contact pieces into contact with two zones of the segment of rod occupying diametrically opposite generator lines, the contact pieces being secured to respective ones of the measuring fingers;

moving the two measuring fingers such that the contact pieces are pressed against the rod in two zones situated on the diametrically opposite generator lines, so that the fingers travel in a vertical axial direction of the rod along the segment situated between the two spacer grids; and using an electromagnetic sensor to measure a distance between the contact pieces of the measuring fingers in the first horizontal direction perpendicular to an axial displacement of the measuring fingers.

2. The method according to claim 1, further comprising:

calibrating the electromagnetic sensor by putting the contact pieces of the measuring fingers against the diametrically opposite generator lines of a reference rod prior to putting the measuring tool into place.

3. The method according to claim 1, further comprising measuring a temperature of the pool in a vicinity of the segment of fuel rod on which diameter measurements are performed; and correcting a spacing measured between the contact pieces of the measuring device as a function of the temperature measurement.

4. A method of measuring the diameter of a peripheral rod of the fuel assembly according to claim 1, along a segment of the peripheral fuel rod that is engaged for supporting the rod in a cell of the spacer grid and having a wear zone in an outer surface, the method comprising:

initially applying traction to the fuel rod to cause the rod to move axially relative to the spacer grid so as to extract the segment of fuel rod that includes the wear zone from the spacer grid; and implementing the measuring method on the segment of rod that includes the wear zone extracted from the spacer grid by moving the measuring fingers which has the contact pieces in contact with the diametrically opposite generator lines of the outer surface of the rod in the axial direction along the length of the segment that includes the wear zone.

5. A device for measuring a diameter of a peripheral rod of a fuel assembly of a nuclear reactor cooled by light water, the assembly comprising a bundle of fuel rods and a framework for supporting the fuel rods, the framework comprising spacer grids distributed in an axial longitudinal direction of the bundle of rods, guide tubes placed in certain positions for rods inside the bundle, and end nozzles, measurement taking place underwater in a pool in which the fuel assembly is placed with its longitudinal axis in a vertical direction, and being performed between two successive spacer grids along a longitudinal segment of the rod situated at the periphery of the fuel assembly, the device comprising:

a measuring tool comprising two measuring fingers mounted on a tool support with freedom to move relative to each other in a first horizontal direction, the fingers being urged towards each other by a resilient return arrangement and extending in a second horizontal direction perpendicular to the first horizontal direction;

an electromagnetic displacement sensor connected to the measuring fingers via two respective portions that are movable relative to each other;

an arrangement for moving the measuring tool in the two horizontal directions and in a vertical direction; and a measuring station having an arrangement for receiving and processing measurement signals from the electromagnetic sensor.

6. The device according to claim 5, wherein the arrangement for moving the measuring tool in the first and second horizontal directions is a set of X-Y displacement tables.

7. The device according to claim 5, wherein the arrangement for moving the measuring tool in the vertical direction is a guide post and an arrangement associated with the guide post for implementing displacement at a slow speed.

8. The device according to claim 5, wherein the electromagnetic sensor for measuring a distance between the contact pieces of the measuring fingers is an LVDT sensor comprising a body with an electrical coil and a plunger core secured to a rod, the body of the sensor being fixed to a first of the two measuring fingers and the rod of the sensor being fixed to a second of the two measuring fingers.

9. The device according to claim 5, wherein the measuring station placed above a level of the pool comprises:

a unit for acquiring and processing analog signals from the electromagnetic sensor; and a computer for making use of the signals.

10. A device according to claim 5, further comprising:

an arrangement for viewing the fuel assembly and the measuring device in the pool; and an arrangement configured to control the displacements of the measuring tool.

11. A device according to claim 10, wherein the arrangement for viewing the measuring tool comprises video cameras configured to further view the fingers of the measuring tool for aiming at a peripheral rod of the fuel assembly.

12. A device according to claim 5, further comprising:

a probe to measure a temperature in the pool in a vicinity of the measuring tool.

* * * * *

UNITED STATES PATENT AND TRADEMARK OFFICE
CERTIFICATE OF CORRECTION

PATENT NO. : 6,879,653 B2
DATED : April 12, 2005
INVENTOR(S) : Jairo Arias et al.

It is certified that error appears in the above-identified patent and that said Letters Patent is hereby corrected as shown below:

Column 1,
Line 35, change "and they" to -- and they are accessible on each of the four faces of the fuel assembly and of the bundle of rods. --.

Column 7,
Line 18, change "et" to -- the --.

Signed and Sealed this

Tenth Day of January, 2006

JON W. DUDAS
*Director of the United States Patent and Trademark Office*